United States Patent
Sarin

(10) Patent No.: US 10,885,517 B2
(45) Date of Patent: Jan. 5, 2021

(54) PRELOADED DIGITAL WALLET TOKEN FOR NETWORKLESS TRANSACTION PROCESSING

(71) Applicant: PAYPAL, INC., San Jose, CA (US)

(72) Inventor: Pankaj Sarin, Chennai (IN)

(73) Assignee: PAYPAL, INC., San Jose, CA (US)

(*) Notice: Subject to any disclaimer, the term of this patent is extended or adjusted under 35 U.S.C. 154(b) by 817 days.

(21) Appl. No.: 15/237,545

(22) Filed: Aug. 15, 2016

(65) Prior Publication Data
US 2018/0047016 A1    Feb. 15, 2018

(51) Int. Cl.
| G06Q 20/36 | (2012.01) |
|---|---|
| G06Q 20/10 | (2012.01) |
| G06Q 20/32 | (2012.01) |
| G06Q 20/38 | (2012.01) |

(52) U.S. Cl.
CPC ....... *G06Q 20/3674* (2013.01); *G06Q 20/105* (2013.01); *G06Q 20/3224* (2013.01); *G06Q 20/3276* (2013.01); *G06Q 20/38215* (2013.01)

(58) Field of Classification Search
CPC ......... G06Q 20/38215; G06Q 20/3276; G06Q 20/3674; G06Q 20/105; G06Q 20/3224; G06Q 20/10; G06Q 20/32
USPC ....................................................... 705/67
See application file for complete search history.

(56) References Cited

U.S. PATENT DOCUMENTS

| 9,414,348 | B2* | 8/2016 | Saari | H04W 64/00 |
|---|---|---|---|---|
| 2007/0205270 | A1* | 9/2007 | Kemper | G06Q 20/382 235/380 |
| 2013/0346302 | A1* | 12/2013 | Purves | G06Q 20/108 705/40 |
| 2014/0006273 | A1* | 1/2014 | Gopinath | G06Q 20/10 705/40 |
| 2014/0040453 | A1* | 2/2014 | Vijayakumaran | H04L 41/082 709/224 |
| 2016/0019536 | A1* | 1/2016 | Ortiz | G06Q 20/3227 705/67 |

* cited by examiner

*Primary Examiner* — Bennett M Sigmond
*Assistant Examiner* — Marla Hudson
(74) *Attorney, Agent, or Firm* — Haynes and Boone, LLP

(57) ABSTRACT

There are provided systems and methods for a preloaded digital wallet token for networkless transaction processing. A user may utilize a communication device while shopping at physical merchant locations, such as retail storefronts, where the communication device may provide transaction processing services through a mobile application executing on the communication device. The communication device may provide transaction processing services through the application in an offline environment by utilizing a preloaded digital token having encrypted data, for example, where the communication device loses network connectivity. The encrypted data may include information necessary to resolve transaction processing by a merchant device receiving the token from the communication device. Moreover, the encrypted data may include limitations on use of the token for transaction processing, such as location limitations and/or transaction amount or time limits. The token may also be updated when the communication device reconnects to a network.

20 Claims, 6 Drawing Sheets

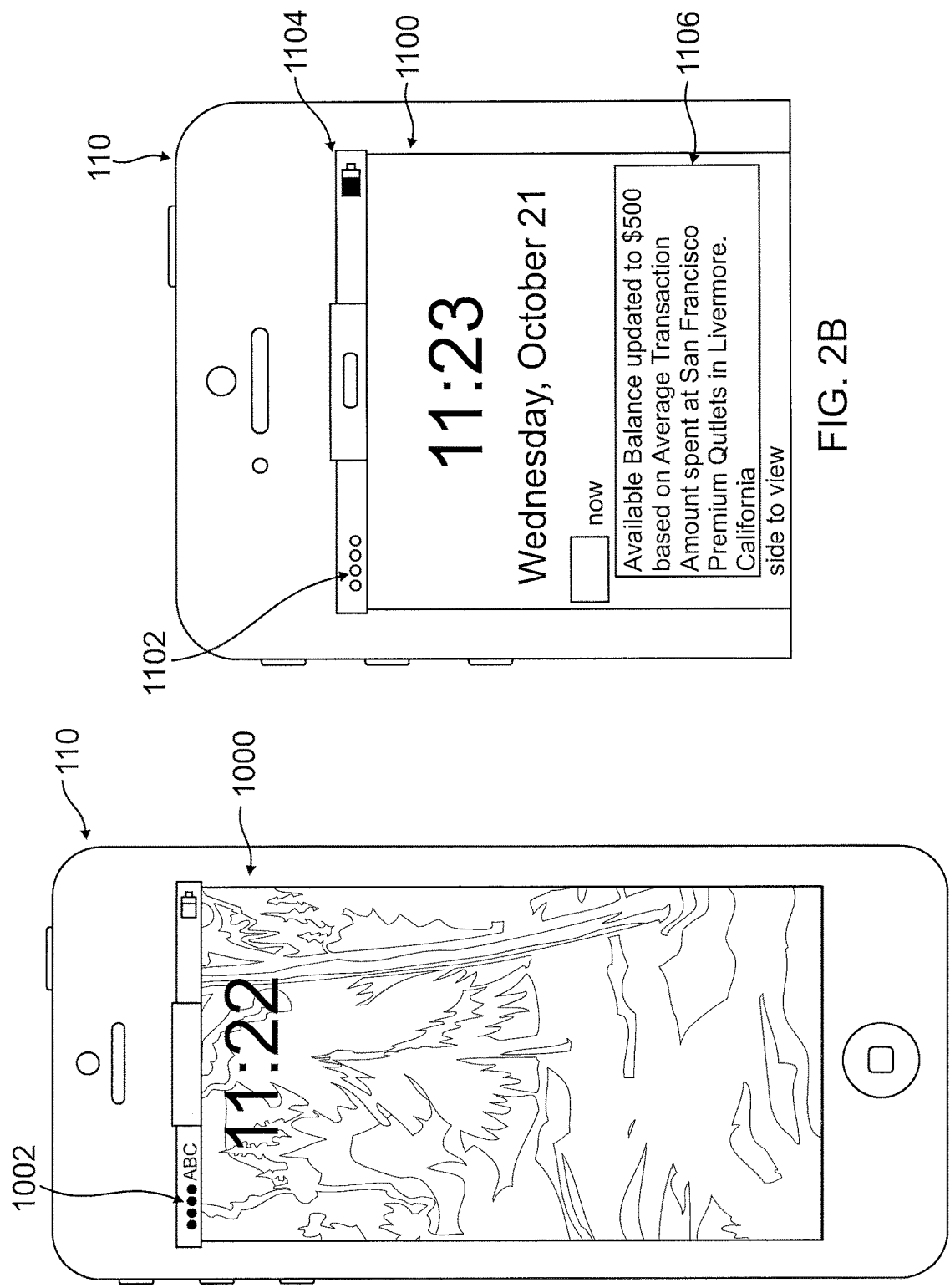

PRELOADED DIGITAL WALLET TOKEN FOR NETWORKLESS TRANSACTION PROCESSING

TECHNICAL FIELD

The present application generally relates to tokenized transaction processing, and more specifically to a preloaded digital wallet token for networkless transaction processing.

BACKGROUND

Various types of service providers may provide processing services to users, merchants, other types of businesses, and different entities. Such processing services may include transaction processing for transactions between a user and another entity, such as another user, merchant, business, or other entities that may engage in transactions with users. Additionally, the service provider may provide such transaction processing services through the user's communication device, such as a mobile smart phone utilizing a mobile application to engage in electronic transaction processing with a merchant. However, these services provided by the service provider traditionally require network communications so that the service provider may receive transaction details from the user's communication device and provide real-time data for a user's transaction processing instruments to the user's communication device and the merchant's device. Thus, in locations having low or no network connectivity, for example, to a wireless communication provider and/or a local area network providing Internet access, the user may be prevented from performing transaction processing using the services provided by the service provider. Moreover, where the user may experience network lag and/or connectivity issues due to bandwidth problems and/or server availability, the user may also be prevented from performing transaction processing even when a network is available for use by the user's communication device.

BRIEF DESCRIPTION OF THE DRAWINGS

FIG. 2A is an exemplary interface of a communication device having network connectivity to receive a preloaded digital wallet token for use in transaction processing without the network connectivity, according to an embodiment;

FIG. 2B is an exemplary interface of a communication device receiving and utilizing a preloaded digital wallet token for networkless transaction processing, according to an embodiment;

Figure 1:
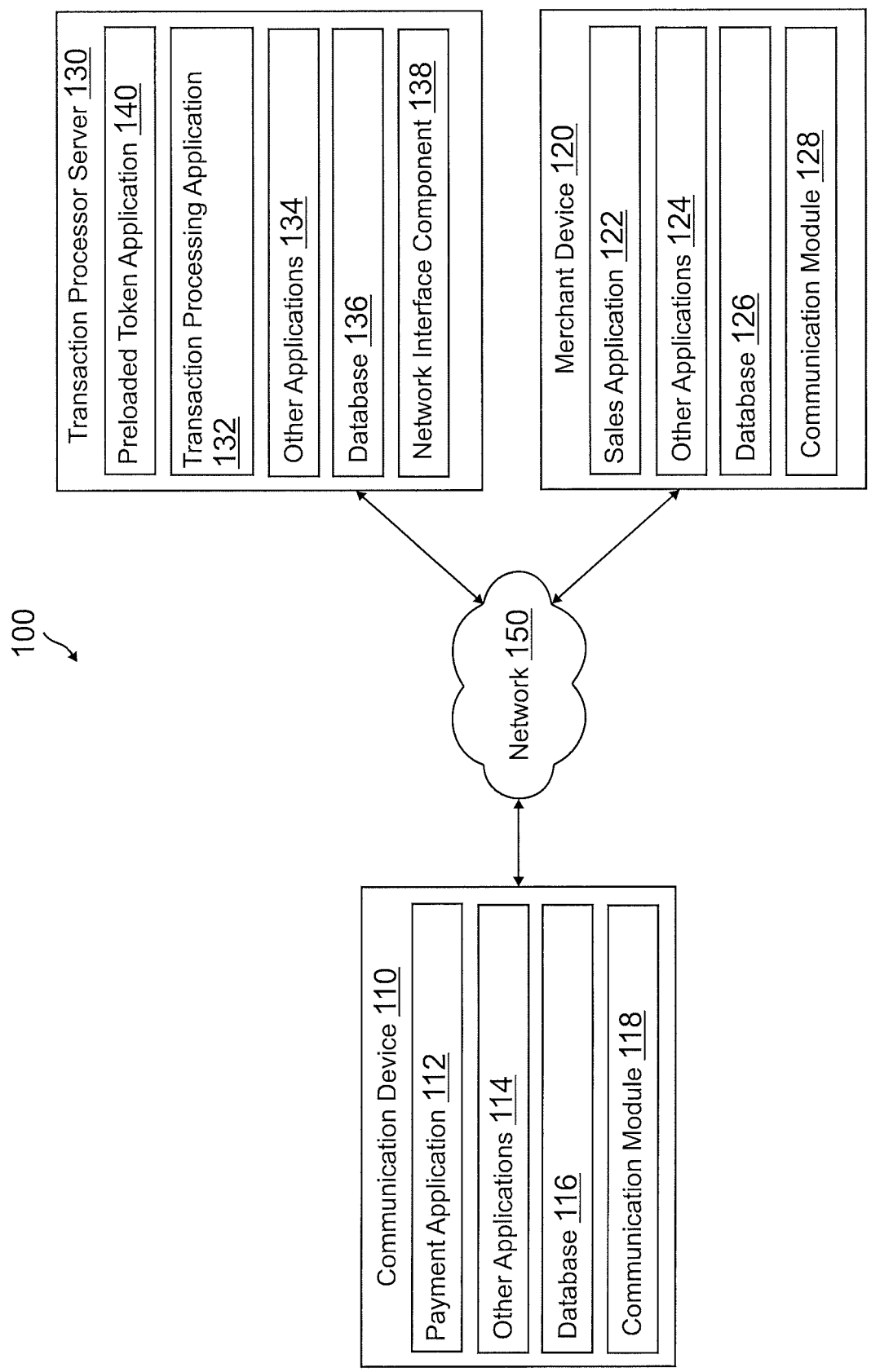
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a preloaded digital wallet token for networkless transaction processing. As used herein, "networkless" includes both no network connectivity and low (or below a predetermined threshold) connectivity to a network. Systems suitable for practicing methods of the present disclosure are also provided.

According to various embodiments, a user may be detected as entering a location, for example, through a geo-location detected of the user using a GPS locator or other location detection service of a user's mobile device. Thus, a service provider may determine a predicted transaction amount required by the user within the location. The predicted amount may be based on a user profile, which may include a history of the user with the location, as well as user spending and transaction histories by other users within the location. In this regard, an available wallet balance for the user may be continually updated based on the user's location, for example, as the user moves within the location. The available wallet balance may correspond to a token, which may provide transaction processing through provision of the token to a merchant device. The token may identify a wallet of the user, where the wallet is authorized to allow spending of a particular amount corresponding to the predicted amount determined based on the location of the user and the user's, as well as other users', past spending amount and transactions histories at the dynamically changing location. Moreover, the token may be dynamically updated while the user is connected to a network in order to reflect the user's predicted spending amount between locations that the user travels between.

In further embodiments, one or more users may wish to engage in electronic transaction processing with one or more other entities, such as merchants, businesses, or other commercial or governmental agencies. For example, a user may wish to provide a payment to a merchant for a transaction, such as a purchase of one or more items, a bill payment, or other type of required payment or transfer of money by the user to the merchant. Various service providers may provide transaction processing services that may allow two or more entities (e.g., personal users, groups of users, merchants, etc.) to engage in electronic processing for a transaction. For example, a payment provider service may offer transaction processing services that provide transfers, payment services, reimbursement or refund services, and other type of financial services. These service providers may further provide additional types of services, including account services and digital wallet service, for example, to store one or more financial instruments of the user for use in transaction processing and provide a digital wallet that may be utilized to perform transaction processing through tokenized payment services.

Thus, the user and/or the merchant may further be required to establish an account with the service provider in order to engage in transaction processing. The user and/or the merchant may be required to provide personal, business, or other identification information to establish the account, such as a name, address, Employer Identification Number (EIN), and/or other information. The user and/or the merchant may also be required to provide financial information, including payment cards (e.g., credit/debit cards), bank account information, gift cards, and/or benefits/incentives, which may be utilized to provide payments or otherwise engage in processing of another transaction. In order to create an account, the user and/or the merchant may be required to select an account name and/or provide authentication credentials, such as a password, personal identification number (PIN), security questions, and/or other authentication information. The service provider may utilize such information to create the account for the user, and provide the user with a digital wallet to the user that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a token), as well as authentication information including an identifier for user of the digital wallet, which may be encrypted.

Once an account is created, the account may be accessed through a web browser from a website of the service provider and/or a dedicated application of the service provider, such as a mobile smart phone application. The user and/or the merchant may engage in transaction processing through accessing their respective account and providing transaction information for the transaction. Thus, the aforementioned token may be issued to the user and/or the merchant for their respective accounts, where the token may include data (which may be encrypted) allowing the service provider to identify the user and/or the merchant and their account, as well as authenticate the user and/or the merchant. As such, the token may be transmitted to other entities during transaction processing, which may allow the service identify and authenticate the user's and/or the merchant's account and engage in transaction processing. Thus, the accounts may store information associated with each user, merchant, or other entity for use in transaction processing.

In this regard, a computing device for a user and/or a merchant, such as a communication device of a user or a merchant point-of-sale device of a merchant, may further include a mobile payment application or more generally a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with a payment provider, such as PayPal® or other online payment provider service, which may provide payments and the other aforementioned transaction processing services on behalf of user, merchants, and other entities. The application may execute on the computing device for a user or a merchant, and may provide various functionalities and processes to the user and/or merchant. For example, a user may utilize the application to send and/or receive payments between the user and another user/merchant for one or more items purchased in a transaction. The merchant may similarly send and/or receive payments between the merchant and another user/merchant, which may include receiving payment for transactions.

Generally, during transaction processing, the computing device of the user and the merchant requires network access in order to perform transaction processing. For example, the computing device of the user may be required to connect to the service provider and authenticate the user for use of the user's account and digital wallet. The computing device may be required to retrieve a token that allows use of the account/digital wallet and provide the token to the merchant's computing device. This enables offline transaction processing to users and/or merchant, for example, where the computing device does not have a network connection allowing communication with the service provider. For example, different merchant locations may have signal connectivity issues with a wireless network provider that allows the user to interact with the service provider through a network connection to one or more servers of the service provider. In other embodiments, the signal strength may be limited or poor at merchant locations, or the network bandwidth may cause issues with connection a server for the service provider. Additionally, the service provider itself may have issues or problems that would cause the user's computing device to be unable to connect to the server for the service provider and/or execute processes of the service provider. In this regard, the service provider may have planned outages, such as server maintenance, or may be aware of high server workload and delayed response time. Such information may be entered by an administrator of the service provider or inferred by the service provider from historical server maintenance and/or workload. Thus, the service provider may cause a digital token to be pre-generated and pre-loaded to the user's computing device for use in transaction processing with the merchant without a network connection required by the computing device (e.g., mobile phone signal to a wireless communication carrier).

The service provider may detect a location of a user. The location of the user may be determined through a GPS module or locator associated with the user, such as a GPS locator of the user's computing device. The location of the user may be tracked in real-time utilizing the device of the user or may be queried at specific intervals. In other embodiments, the location of the user may be sent by the user's computing device to the service provider, which similarly may occur continuously or at specific intervals. In this regard, the computing device of the user may send the location of the user to the service provider on detection of the user at a specific location, such as a location at or nearby blackout areas that are known to not have network connectivity. Additionally, instead of the location of the user, a more general request to generate a preauthorized token allowing use of the user's account/digital wallet and/or authorizing the user for a certain amount and use of the account/digital wallet may be communicated to the service provider by the computing device. For example, the computing device may detect a lack of signal strength or decreased signal strength, and may cause the request to be sent. The computing device may also be disconnected from the network and cause the request to be loaded and sent when connectivity is restored. Once the location and/or the request is received by the service provider, the service provider may begin generation of a preauthorized token allowing for offline transaction processing by the user.

Thus, the service provider may determine an amount for preauthorization and use by the user with the preauthorized token. The amount may correspond to a predicted funding amount to preauthorize for the user. The amount may be a general amount, such as $100, or may be an amount requested by the user, for example, through account settings for the user's account and/or entered into the request for the preauthorized token. For example, on detection of the user's location, the user may be alerted that a preauthorized token may be required through the user's computing device. The user may then enter an amount for establishment of the pre-authorization token. Moreover, in other embodiments, the service provider may determine a predicted preauthorization amount based on previous transaction amounts by other users at the location, previous transaction amounts by the user at the location, sale amounts at a current time, a funding limit set by the user, funds available to the user, a merchant at the location, or a merchant type for the merchant at the location. Such information may be updated in real-time based on information available from the merchant so that the predicted authorization amount is current based on information available for one or more merchants at the location and/or needs of the user. Additionally, the predicted preauthorization amount may be based on needs, shopping lists, and/or requirements for the user at the location. For example, if it is known that the user has a family of five and it is near dinner time, the predicted preauthorization amount may account for a purchase of dinner with a merchant at or nearby the location that would account for the family of 5. Similarly, if the user has entered a shopping list for a grocery store or expressed past interest (e.g., through search histories, a wish list, etc.) in an item from a merchant, the predicted preauthorization amount may account for such items.

Utilizing the predicted preauthorization amount, the service provider may generate the preauthorized token. The preauthorized token may include data necessary to facilitate transaction processing with another device receiving the preauthorized token, such as a merchant point-of-sale (POS) device. Thus, the preauthorized token may include identifiers for the user, the user's account/digital wallet, and/or authentication identifiers or other data that authenticates the user for use of the preauthorized token and the user's account/digital wallet. The service provider may hold an amount for the preauthorization in escrow so that the service provider may utilize this amount to provide payment for a transaction. Thus, a financial instrument or available funding may be held while the preauthorized token is active, which may be refunded or removed from escrow if part or all of the amount is not used. In various embodiments, the authentication data may instead be added by the user's computing device on authentication of the user using the computing device, such as entry of authentication credentials to an interface of the user's computing device. The preauthorized token may be encrypted so that the data and/or identifiers in the token cannot be determined by an entity not having the correct encryption keys, such as a malicious party fraudulently receiving the token. The preauthorized token may further include information identifying the service provider and/or allowing the merchant device to contact the service provider to process a transaction and resolve a payment to the merchant. Additionally, the preauthorized token may be limited to a certain amount of time and/or geo-location. For example, the token may be limited to the location detected for the user, which may be performed by geo-fencing the location and allowing the preauthorized token to be used within the geo-fence. The token may also be limited to use for a specific time interval, such as a predicted amount of time the user will be at the location or a length of time at the location set by the user, specific to the location (e.g., based on a merchant type or event at the location), or determined from past visits by the user to the location.

Once generated, the preauthorized token may be communicated to the computing device of the user. The user's device may then store the preauthorized token, and may determine when to utilize the preauthorized token. For example, the user's device may store the preauthorized token and only utilize the preauthorized token if the device does not have network connectivity. Thus, if the computing device is able to access a network and connect to the service provider, the computing device may utilize traditional transaction processing through the network connection to process a transaction between the user and the merchant. However, if the device loses network connectivity, the device may utilize the preauthorized token for transaction processing. In other embodiments, the device may utilize the preauthorized token for all transaction processing for the terms of the token, such as the location and/or time limit on the location. If the user utilizes the preauthorized token on the device for transaction processing, the computing device of the user may communicate the preauthorized token to the merchant device. The token may be communicated through short range wireless communications, such as Bluetooth, near field communications, Bluetooth Low Energy, LTE Direct, radio, infrared, or other communication protocol. In other embodiments, the token may be encoded into a barcode or a QR code, which may be scanned by a scanner of the merchant device or imaged using a camera. The code may then be decoded to retrieve data for the token, where the merchant device resolves transaction processing by communicating with the service provider to provide merchant information, transaction information, and/or the preauthorized token to the service provider and receive transaction processing results. In various embodiments, the user may request that the token is transmitted to the merchant device utilizing the computing device. Additionally, the computing device may receive transaction data, for example, through scanning of a barcode/QR code or through short range wireless communications, and may communicate the token back to the merchant device using the aforementioned transmission channels.

Thus, the service provider may receive transaction information during transaction processing, which may correspond to entities in a transaction (e.g., an entity name, identifier, and/or token, such as a preauthorized token used to identify an account of the user during offline transaction processing), items in a transaction, transaction cost, tax, tip, shipping information, and other types of transaction information. The transaction information may be generated from a transaction between the user and the merchant, and may be provided to the service provider for processing. Thus, the service provider may then process the transaction using the preauthorized token by identifying the account of the user using the preauthorized token and processing the account to provide a payment to an account of the merchant. The payment may be provided using funds that are held in escrow by the service provider, such as funds held from a financial instrument and/or available account funding. Thus, a payment may be provided by deducting an amount from the user's account and crediting the amount (which may have deducted a fee) to the account of the merchant or other user. Where the merchant device similarly does not have network connectivity, the transaction may be resolved when one or more of the user's computing device and/or the merchant device reconnects to a network. A transaction history may record a receipt or other history of the transaction, which may be utilized to provide goods, services, and/or products (referred to herein as an "item" or "items") to the user in the transaction.

The service provider may then update the account of the user based on the results of transaction processing (e.g., approval or denial of the transaction, and the resulting monetary change). The service provider may then await further network connectivity of the user's computing device with the service provider. Once the user's device reconnects to the network, the service provider may further update the preauthorized token of the user's device based on the results of transaction processing. For example, if the user changes location or requires additional funding, the preauthorized token may be updated and/or replaced by another preauthorized token. Thus, if a new location of the user requires a different amount and/or other terms for use of the preauthorized token during offline transaction processing, the service provider may update the current token on the device or provide the device with a new token. Additionally, after the user's device utilizes the token, the user's device may further update an available amount for use with the token, such as the predicted preauthorization amount fixed for the preauthorized token. Thus, the device may ensure that the user does not go over a transaction limit for the preauthorized token. However, if the user would like to go over the preauthorized amount, the service provider may perform risk analysis of the user and/or the transaction to determine whether to authorize any additional amount over the preauthorized amount.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 120, and a transaction processor server 130 in communication over a network 150. The user (not shown) may utilize communication device 110 to utilize the various features available for communication device 110, which may include processes and/or applications associated with transaction processing for a transaction between the user and a merchant (not shown) associated with merchant device 120. In this regard, communication device 110 may interact with transaction processor server 130 to cause generation of a preauthorized token for offline transaction processing, for example, during networkless usage of communication device 110. Thus, transaction processor server 130 may generate the token and communicate the token to communication device 110 while communication device is connected to network 150. On loss of connectivity to network 150 by communication device 110, the token stored to communication device 110 may be communicated to merchant device 120 for transaction processing. Merchant device 120 may utilize the token with transaction processor server 130 to resolve transaction processing, for example, by receiving payment from an account of the user with transaction processor server 130 through the token.

Communication device 110, merchant device 120, and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with merchant device 120, and/or transaction processor server 130. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a payment application 112, other applications 114, a database 116, and a communication module 118. Payment application 112 and other applications 114 may correspond to executable processes, procedures, and/or applications with associated hardware. In other embodiments, communication device 110 may include additional or different modules having specialized hardware and/or software as required.

Payment application 112 may correspond to one or more processes to execute software modules and associated devices of communication device 110 to enter one or more payment instruments or other funding sources for storage in a digital wallet associated with a payment account (e.g., stored and/or serviced by transaction processor server 130), receive a preauthorized token that is preloaded to communication device 110 during network connectivity, and engage in transaction processing with another entity, such as a merchant, using the preauthorized token during offline transaction processing. In this regard, payment application 112 may correspond to specialized hardware and/or software utilized by a user of communication device 110 that initially provides an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.) Such information may be stored with transaction processor server 130 for use with an online digital wallet stored to an account for the user with transaction processor server 130, which may be utilized for transaction processing with another entity, such as a merchant associated with merchant device 120. In various embodiments, information for the account may also be stored to communication device 110 for use in an offline environment, such as a preloaded authentication token that allows for networkless transaction processing by communication device 110. The account accessible through payment application 112 may be used to initiate, receive, and/or process/complete transactions using services provided by transaction processor server 130. Once entered, the payment instruments may be communicated to transaction processor server 130 over network 150 by payment application 112 for establishment and/or maintenance/update of the account and/or entry into the digital wallet for the user. The user of communication device 110 may also enter discounts and/or benefits to payment application 112 for storage to the digital wallet and use during transaction processing.

Payment application 112 may utilize one or more user interfaces, such as graphical user interfaces presented using an output display device of communication device 110, to enable the user associated with communication device 110 to perform transaction processing, including transaction processing without network connectivity. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information (e.g., a website for transaction processor server 130), presenting the website information to the user, and/or communicating information to the website, such as a location of the user. In various embodiments, the offline preauthorized token allowing for networkless transaction processing may be received from the website. However, in other embodiments, payment application 112 may include a dedicated application of transaction processor server 130 or other entity (e.g., a merchant), which may be configured to assist in processing transactions, including providing a location of the user and receiving the preauthorized token from transaction processor server 130. The interface(s) providing by payment application 112 may be utilized to enter transaction information, receive transaction information from merchant device 120, and/or initiate a process to communicate the preauthorized token to merchant device 120.

Payment application 112 may be utilized to select payment instrument(s) for use in providing payment for a purchase transaction, transfer, or other financial process. As discussed herein during network connectivity, payment application 112 may utilize user financial information, such as a credit card, bank account, or other financial account, as a payment instrument when providing payment information. Additionally, payment application 112 may utilize a digital wallet stored to an account with a payment provider, such as transaction processor server 130, as the payment instrument, for example, through providing a token that identifies the account and authenticates the user for use of the account. However, at times where network connectivity cannot be made, or where transaction processor server 130 is unavailable, payment application 112 may be used to select the preauthorized token and communicate the token to merchant device 120. Payment application 112 may transmit location information to transaction processor server 130 during network connectivity in order to receive the preauthorized token from transaction processor server 130 based on the location of the user (e.g., based on the merchant at the location and network connectivity issues at the location). Thus, selection of the preauthorized token may occur prior to, at, or after establishment of the transaction. Payment application 112 may then communicate the preauthorized token to merchant device 120 utilizing a networkless connection and/or communications with merchant device 120. For example, a wired or wireless connection may be established between communication device 110 and merchant device 120, for example, through short range wireless communications such as Bluetooth, Bluetooth Low Energy, NFC, LTE Direct, radio, infrared, etc. In other embodiments, communication device 110 may include a display device, where payment application 112 may encode the preauthorized token into a bar code, QR code, or other visual representation and display the code on the display device for capture by merchant device 120. Transaction processor server 130 may then use the preauthorized token during processing of payment, as discussed herein with respect to transaction processor server 130. In various embodiments, the preauthorized token may include limits on use, which may be checked by payment application 112 prior to communication of the token to merchant device 120. However, in other embodiments, transaction processor server 130 may check for the validity of the token and available use based on the transaction information. Payment application 112 may receive an amount processed for the transaction using the preauthorized token from input by the user and/or communication with merchant device 120, and update a preauthorized value for the token so that a limit on an amount of the token is updated and will not be exceeded.

Thus, payment application 112 may provide the digital preauthorized token to authenticate the user and/or use the user's payment account, digital wallet, and/or payment instruments during offline transaction processing when communication device 110 does not have network connectivity. Payment application 112 may use such a token during transaction processing to authenticate the user and complete transaction processing by providing the token, which may be encrypted and/or provided through a secure channel, to merchant device 120 to authenticate the user and/or the user's payment account, digital wallet, and/or payment instruments to transaction processor server 130 and allow for transaction processing and payment using the user's payment account, digital wallet, and/or payment instruments. Payment application 112 may be utilized to view the results of payment, for example, using transaction histories, dispute resolution processes, and other post-transaction process. Where communication device 110 does not have network connectivity, payment application 112 may receive the transaction histories from merchant device 120 and/or on restoration of network connectivity. Additionally, when network connectivity is restored, payment application 112 may update transaction processor server 130 of the user's location, for example, a change in the location of the user, which may cause receipt of a new token or update to the previous token from transaction processor server 130.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment application 112 and/or other applications 114, identifiers associated with hardware of communication device 110, or other appropriate identifiers, such as identifiers used for payment/user/device authentication or identification, which may be communicated as identifying communication device 110 to transaction processor server 130. In various embodiments, account information and/or digital wallet information may be stored to database 116 for use by communication device 110. For example, a preauthorized token may be loaded to communication device 110 and stored to database 116 for use in offline transaction processing.

Communication device 110 includes at least one communication module 118 adapted to communicate with merchant device 120 and/or transaction processor server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices (e.g., merchant device 120) using short range communications, such as Bluetooth Low Energy, LTE Direct, WiFi, radio frequency, infrared, Bluetooth, and near field communications.

Merchant device 120 may be implemented using any appropriate hardware and software configured for wired and/or wireless communication with communication device 110 and/or transaction processor server 130. Thus, merchant device 120 may include architecture to provide sales of items, for example, through a physical merchant location. In this regard, merchant device 120 may correspond to a point-of-sale device configured to provide transaction processing, or other type of device, including personal computing devices, mobile smart phones, and/or wearable computing devices. Merchant device 120 may include one or more network connections, which may be utilized to resolve a transaction using a preauthorized token. Where a network connection cannot be made or where transaction processor server 130 is unavailable, merchant device 120 may further include components to store transaction information and/or receive a preauthorized token for later processing with transaction processor server 130. Merchant device 120 may further be used to process payments for items and provide incentives for purchase of items and/or advertisement of items to other users. Although only one merchant device is shown, a plurality of merchant devices may function similarly.

Merchant device 120 of FIG. 1 contains a sales application 122, other applications 124, a database 126, and a communication module 128. Sales application 122 and other applications 124 may correspond to processes, procedures, and/or applications executable by a hardware processor, for example, a software program. In other embodiments, merchant device 120 may include additional or different modules having specialized hardware and/or software as required.

Sales application 122 may correspond to one or more processes to execute modules and associated specialized hardware of merchant device 120 that provides an interface for a merchant or merchant employee to engage in a transaction to sell one or more items offered by the merchant associated with merchant device 120, and further provide checkout and payment processes for a transaction to purchase the items for sale from the merchant corresponding to merchant device 120 through use of a preauthorized token received from communication device 110. In this regard, sales application 122 may correspond to specialized hardware and/or software of merchant device 120 to provide a convenient interface to permit a merchant to offer items for sale and/or enter item information into a transaction to sell the items. For example, sales application 122 may be implemented as an application that may be utilized by the merchant or a merchant employee to enter items selected by a user to a transaction, determine a price for the transaction, and initiate a checkout and payment process for the transaction. Thus, merchant device 120 may be local to a physical merchant location and provide transaction processing processes through interfaces displayed to a merchant or merchant employee at the merchant location. Sales application 122 may include information for a price for the item, a discount for the item, a price change for the item, and/or other incentives for items and/or with the merchant corresponding to merchant device 120 (e.g., rebates, payments, etc.). Sales application 122 may be used to set and/or determine a benefit or incentive provided to a user of communication device 110. The sales data and other item data may be retrievable by communication device 110 and/or transaction processor server 130, such as requestable through an API call, retrievable from a database, and/or scraped from an online resource. Once item information is entered to a transaction, sales application 122 may require a payment instrument for transaction processing, such as a preauthorized token that may be received from communication device 110.

Sales application 122 may be used to establish a transaction once the user associated with communication device 110 has selected one or more items for purchase. Once a payment amount is determined for the transaction for the item(s) to be purchased, sales application 122 may request payment from the user. Sales application 122 may receive payment processing information, such as a preauthorized token received from communication device 110 where communication device 110 may not have network access or connectivity, or where transaction processor server is unavailable. In such embodiments, the transaction may be processed by providing transaction information with the preauthorized token to transaction processor server 130 over network 150. The token may be received by merchant device 120 from communication device 110 through short range wireless communications or through scanning a code displayed on communication device 110 and decoding the code to retrieve token data. Thus, payment provided to the merchant account, and notification of payment (or failure, for example, where there are insufficient user funds) may be sent to sales application 122. The payment may be made by transaction processor server 130 on behalf of the user associated with communication device 110. Sales application 122 may then receive the results of the transaction processing, and complete the transaction with the user, for example, by providing the user the items for the transaction or declining the transaction where the user is not authenticated or the transaction is not authorized (e.g., insufficient funds).

Merchant device 120 includes other applications 124 as may be desired in particular embodiments to provide features to merchant device 120. For example, other applications 124 may include security applications for implementing server-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking, online payments, money transfer, or other applications associated with transaction processor server 130. Other applications 124 may contain software programs, executable by a processor, including a graphical user interface (GUI) configured to provide an interface to the user.

Merchant device 120 may further include database 126 which may include, for example, identifiers such as operating system registry entries, cookies associated with sales application 122 and/or other applications 124, identifiers associated with hardware of merchant device 120, or other appropriate identifiers, such as identifiers used for payment/user/device authentication or identification. Identifiers in database 126 may be used by a payment/credit provider, such as transaction processor server 130, to associate merchant device 120 with a particular account maintained by the payment/credit provider. Item, sales, and/or benefit information for items sold by the merchant associated with merchant device 120 may be stored to database 126. Database 126 may further include a received preauthentication token for use in transaction processing, as well as transaction information and/or results, including transaction histories.

Merchant device 120 includes at least one communication module 128 adapted to communicate with communication device 110 and/or transaction processor server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor server 130 may be maintained, for example, by an online service provider, which may provide transaction processing and payment services. In this regard, transaction processor server 130 includes one or more processing applications which may be configured to interact with communication device 110, merchant device 120, and/or another device/server to facilitate processing a transaction when communication device 110 does not have network connectivity by preloading a token preauthorized for a predicted amount required by the user. In one example, transaction processor server 130 may be provided by PAYPAL®, Inc. of San Jose, Calif., USA. However, in other embodiments, transaction processor server 130 may be maintained by or include another type of service provider, which may provide connection services to a plurality of users Transaction processor server 130 of FIG. 1 includes a preloaded token application 140, a transaction processing application 132, other applications 134, a database 136, and a network interface component 138. Transaction processing application 132 and other applications 134 may correspond to executable processes, procedures, and/or applications with associated hardware. In other embodiments, transaction processor server 130 may include additional or different modules having specialized hardware and/or software as required.

Preloaded token application 140 may correspond to one or more processes to execute software modules and associated specialized hardware of transaction processor server 130 to receive location information for a user and process the location information with account information for the user and known transaction requirements associated with the location to generate a preauthorized token and load the preauthorized token to communication device 110. In this regard, preloaded token application 140 may correspond to specialized hardware and/or software to receive location information from communication device 110. The location information may be used to determine whether a preauthorized token should be generated, for example, based on network connectivity issues, server load, or other information indicating that communication device 110 may not be able to interact with transaction processor server 130. In other embodiments, a request for the preauthorized token may be received from communication device 110.

Once the location and/or request is received, preloaded token application 140 may determine a predicted amount to preauthorize for the token and to set aside for use of the token. The amount may be based on the location, such as a predicted amount that the user may require at the location. For example, based on items sold by the merchant at the location, past transactions by the user or other users at the location, and/or other merchant information, preloaded token application 140 may determine an amount predicted for use by the user associated with communication device 110 at the location. In various embodiments, the amount may be limited or established by the user based on account setting or options set by the user for offline transaction processing. The amount and use of the amount may also be limited to the location and/or nearby merchant(s) for the location, as well as a predicted amount of time spent by the user at the location.

Once the amount and other limits for the preauthorized token are determined, preloaded token application 140 may generate the token using the data with account information for the user, such as identifiers necessary for a digital wallet of the user. For example, the preauthorized token may be generated with digital wallet information and limits on use of the digital wallet (e.g., a maximum preauthorized amount for the transactions processed using the preauthorized token) so that the token may identify the account when processing a transaction using the token and allow a payment to be made in accordance with the limits of use of the token from the account. The digital token may be encrypted so that data in the token is not capable of being determined using a third party receiving the token without encryption keys of the user. Once created preloaded token application 140 may load the token to communication device 110 while communication device 110 is in contact with transaction processor server 130 over network 150 for use during networkless transaction processing by communication device 110. Such transaction processing may be done through transaction processing application 132 receive transaction information and the preloaded preauthorized token. Additionally, preloaded token application 140 may hold the value for the amount in escrow during use of the preauthorized token so that the value may be utilized to pay for any transactions processed using the token. Thus, the token may also include data as well as a digital signature from transaction processor server 130 that authenticates the use for use of a set amount of money during offline transaction processing, for example, where merchant device 120 does not have network connectivity to network 150. In such embodiments, merchant device 120 may approve the transaction based on the data and/or digital signature that authorizes the user for use of the preauthorized amount.

Additionally, preloaded token application 140 may detect when communication device 110 restores network connectivity or otherwise reconnects to transaction processor server 130. In such embodiments, preloaded token application 140 may receive updates on use of the preauthorized token from communication device 110, which may be used to update the user's account based on the transaction processing. Additionally, preloaded token application 140 may receive a new location of the user, or other change in the user's location or circumstances. Based on the change to the user's location, the preauthorized token may be updated or replaced by preloaded token application 140, for example, based on a different predicted amount required for preauthorization at the change in location by the user.

Transaction processing application 132 may correspond to one or more processes to execute software modules and associated specialized hardware of transaction processor server 130 to provide payment services to merchants and users, for example though an account and/or payment instruments of the user and/or merchant stored in a digital wallet of the account. In this regard, transaction processing application 132 may correspond to specialized hardware and/or software to establish one or more accounts, including digital wallets storing payment instruments. The services may allow for a payment to the merchant by a user through a payment instrument, including a credit/debit card, banking account, payment account with transaction processor server 130, and/or other financial instrument. In order to establish an account for a merchant and/or user to send and receive payments, transaction processing application 132 may receive information requesting establishment of the payment account. The information may include user personal, business, and/or financial information. Additionally the information may include a login, account name, password, PIN, or other account creation information. The merchant/user may provide a name, address, social security number, or other personal or business information necessary to establish the account and/or effectuate payments through the account. Transaction processing application 132 may further allow the merchant/user to service and maintain the payment account, for example, by adding and removing payment instruments.

Transaction processing application 132 may be used to provide a payment for a transaction to a merchant, for example, between communication device 110 and merchant device 120. The payment for a transaction may be effectuated through a preauthorized token received by transaction processing application 132 from merchant device 120 with transaction information. For example, communication device 110 may receive the preauthorized token from preloaded token application 140 during connectivity to network 150 and store the token for later use during networkless transaction processing. Thus, when communication device 110 wishes to provide payment to merchant device 120 for a transaction, communication device 110 may provide the token to merchant device 120 without use of network 150. Merchant device 120 may the process the transaction with transaction processing application 132 using the token by providing the token and transaction information to transaction processing application 132, for example, at the time of the transaction or at a later time when merchant device 120 reconnects to network 150. Transaction processing application 132 may utilize data in the token to debit an account of the user or funds held in escrow based on the preauthorized token, and provide the payment to an account of the merchant. Transaction processing application 132 may further check any limitations on use of the token to ensure that the limitations are not violated prior to providing payment, such as location and/or time limitations. Transaction processing application 132 may also be used to provide transaction histories for processed transactions.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. As previously discussed, the user and/or the merchant may establish one or more digital wallets and/or accounts with transaction processor server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or or device identifier. Thus, when an identifier is transmitted to transaction processor server 130, e.g., from communication device 110, one or more digital wallets and/or payment accounts belonging to the users may be found. Database 136 may also store the user preferences for an account for the user and/or merchant. Database 136 may also store transaction information and/or preauthorized tokens.

In various embodiments, transaction processor server 130 includes at least one network interface component 138 adapted to communicate communication device 110 and/or merchant device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2A is an exemplary interface of a communication device having network connectivity to receive a preloaded digital wallet token for use in transaction processing without the network connectivity, according to an embodiment. FIG. 2A includes communication device 110 corresponding generally to the described features, processes, and components of communication device 110 in environment 100 of FIG. 1. In this regard, a user utilizing a communication device may have a lock screen interface 1000 on communication device 110, where lock screen interface 1000 corresponds to an interface of an operating system that may display information from a device application, such as payment application 112 of communication device 110 in environment 100 of FIG. 1. In this regard, lock screen interface 1000 displays a connected network signal bar 1002 that informs a user that communication device 110 currently has network signal strength and may interact with a service provider in order to perform transaction processing. Thus, the user is not informed of an offline transaction processing token, such as a preauthorized token for a preauthorized amount to use during offline transaction processing.

FIG. 2B is an exemplary interface of a communication device receiving and utilizing a preloaded digital wallet token for networkless transaction processing, according to an embodiment. FIG. 2B includes communication device 110 corresponding generally to the described features, processes, and components of communication device 110 in environment 100 of FIG. 1. In this regard, a user utilizing communication device 110 may view a notification interface 1100 on the communication device, where notification interface 1100 corresponds to an interface (e.g., an operating system interface, application interface, or other graphic user interface) displaying data from an application, such as payment application 112 of communication device 110 in environment 100 of FIG. 1.

In this regard, interface 1100 displays an offline signal bar 1102 that informs a user that communication device 110 does not have network connectivity and cannot connect to a service provider to perform networked transaction processing using the online services of the service provider. In this regard, in order to perform transaction processing while communication device 110 is operational using battery level 1104, communication device 110 may utilize a preauthorized token received by communication device 110 during the network connectivity of communication device 110 displayed in FIG. 2B. The user may therefore be informed of the availability of the preauthorized token through message 1106, where message 1106 informs the user of the available balance and the location of use for the available balance. The user may then utilize communication device 110 to perform networkless transaction processing with a merchant device using the preauthorized token.

Figure 2C:
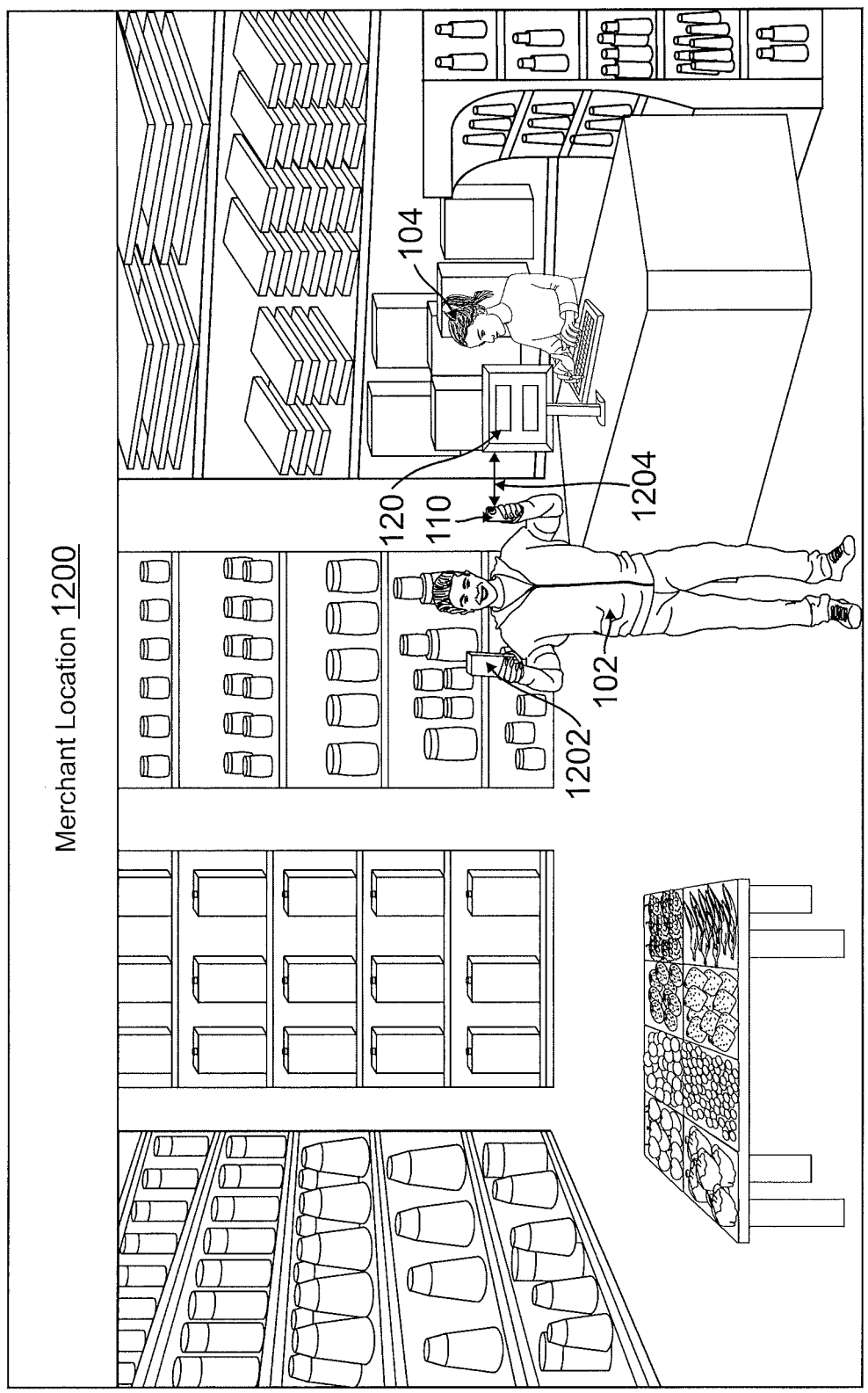
FIG. 2C is an exemplary environment having a user processing a transaction without network connectivity using a preloaded digital wallet token, according to an embodiment.

FIG. 2C is an exemplary environment having a user processing a transaction without network connectivity using a preloaded digital wallet token, according to an embodiment. FIG. 2C includes communication device 110 and merchant device 120 corresponding generally to the described features, processes, and components of communication device 110 and merchant device 120 in environment 100 of FIG. 1. Thus, a user 102 may visit a merchant location 1200 to engage in transaction processing while communication device 110 does not have network connectivity to a service provider providing the transaction processing services.

In this regard, merchant location 1200 corresponds to a location where user 102 may wish to purchase items from a merchant 104 at merchant location 1200. However, merchant location 1200 may not provide network access to user 102 through communication device 110, for example, where signal strength to a wireless communications provider (e.g., a cellular network) is unavailable and/or where a local network access point (e.g., WiFi) is unavailable. In such embodiments, prior to communication device 110 going offline, losing network connectivity, or otherwise being unable to communicate with the service provider, the service provider may preload a digital token to communication device 110 that is preauthorized for an amount to spend at merchant location 1200. Thus, when user 102 wishes to purchase item 1202 from merchant location 1200, user 102 may utilize communication device 110 to transfer the digital token to merchant device 120 over communication process 1204, such as short range wireless communications and/or through scanning and decoding a displayable code having encoded data. Thus, user 102 is still able to transact with merchant 104 through communication process 1204 without requiring network connections for communication device 110.

Figure 3:
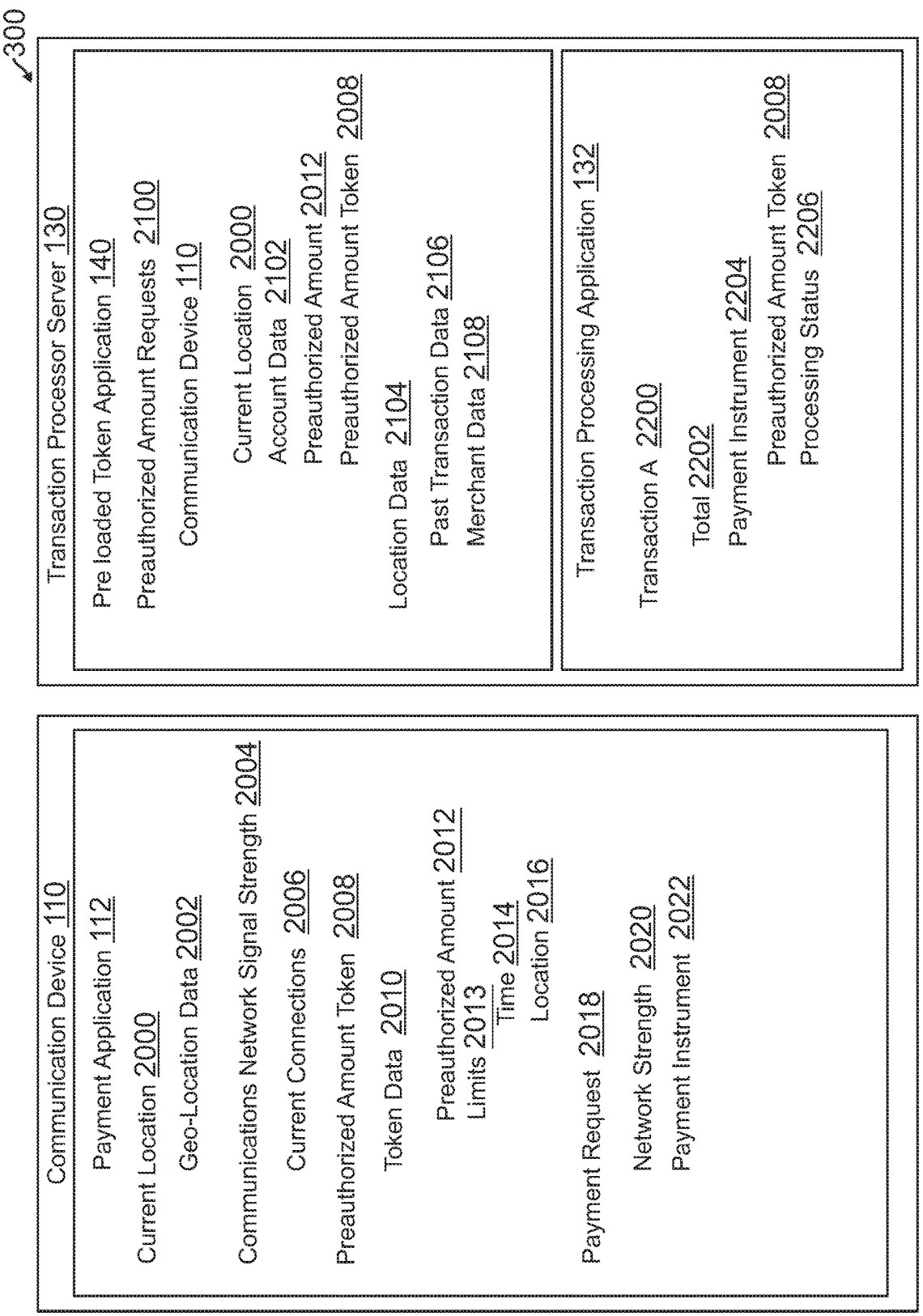
FIG. 3 is an exemplary system environment showing a communication device and a transaction processing server interacting to process a transaction through a preloaded digital wallet token, according to an embodiment.

FIG. 3 is an exemplary system environment 300 showing a database of a service provider having data used to provide risk analysis and fraud detection during transaction processing, according to an embodiment. FIG. 3 includes communication device 110 and transaction processor server 130 corresponding generally to communication device 110 and transaction processor server 130 discussed in reference to environment 100 of FIG. 1.

Communication device 110 includes payment application 112 corresponding generally to the processes and features discussed in reference to payment application 112 in environment 100 of FIG. 1. In this regard, payment application 112 may be utilized to perform networkless transaction processing by communicating a location of communication device 110, and thus the user associated with communication device 110, to transaction processor server 130 and in return receiving a preauthorized token for an amount available for use during offline transaction processing at the location. Thus, payment application 112 includes a current location 2000, such as geo-location data 2002 determined through a GPS locator of communication device 110. In various embodiments, payment application 112 may also track communications network signal strength 2004, which may include current connections 2006 of communication device 110 to one or more wireless network, such as a cellular wireless network allowing for communications with a service provider that provides transaction processing. Current connections may be used to monitor signal strength health of communication device 110 and determine where communication device 110 may require the preloaded token to perform networkless transaction processing. Payment application 112 may receive a preauthorized amount token 2008, which may include token data 2010 having a preauthorized amount 2012 for use at by communication device 110 during networkless transaction processing, which may be limited by limits 2013 for a time 2014 and a location 2016. Additionally, in certain embodiments, payment application 112 may also receive payment request 2018 from a merchant device, for example, through code scanning or short range wireless communications when no network is available. Payment request 2018 may be associated with a network strength 2020 including data indicating that preauthorized amount token 2008 is or is not required, which may be paid through payment instrument 2022 (e.g., preauthorized amount token 2008 where network strength 202 indicates that networkless transaction processing is required).

Transaction processor server 130 includes preloaded token application 140 and transaction processing application 132 corresponding generally to the processes and features discussed in reference to preloaded token application 140 and transaction processing application 132 in environment 100 of FIG. 1. In this regard, preloaded token application 140 may be utilized to receive a location of the user from communication device 110 and cause generation of a preloaded token for a preauthorized amount to communication device 110 for use in networkless transaction processing. Thus, preloaded token application 140 includes a preauthorized amount request 2100 for communication device 110 based on current location 2000 for communication device 110. Utilizing current location 2000 with account data 2102, a preauthorized amount 2012 may be predicted for use by the user at current location 2000, which may be used to generate preauthorized amount token 2008. Additionally, the preauthorized amount 2012 may further be determined based on location data 2104 for locations including current location 2000, such as past transaction data 2106 and merchant data 2108. Additionally, transaction processing application 132 may be used to process a transaction A 2200 generated during offline usage of communication device 110 to provide a payment instrument, such as the preauthorized amount token 2008, to the merchant device. Thus, transaction processing application 132 may process a total 2202 for transaction A 2200 with payment instrument 2204 corresponding to preauthorized amount token 2008. Transaction processing application 132 may then return a processing status 2206, such as a confirmation of the transaction when preauthorization amount token 2008 is valid and limits 2013 are not exceed, or a rejection if invalid or exceed, respectively.

Figure 4:
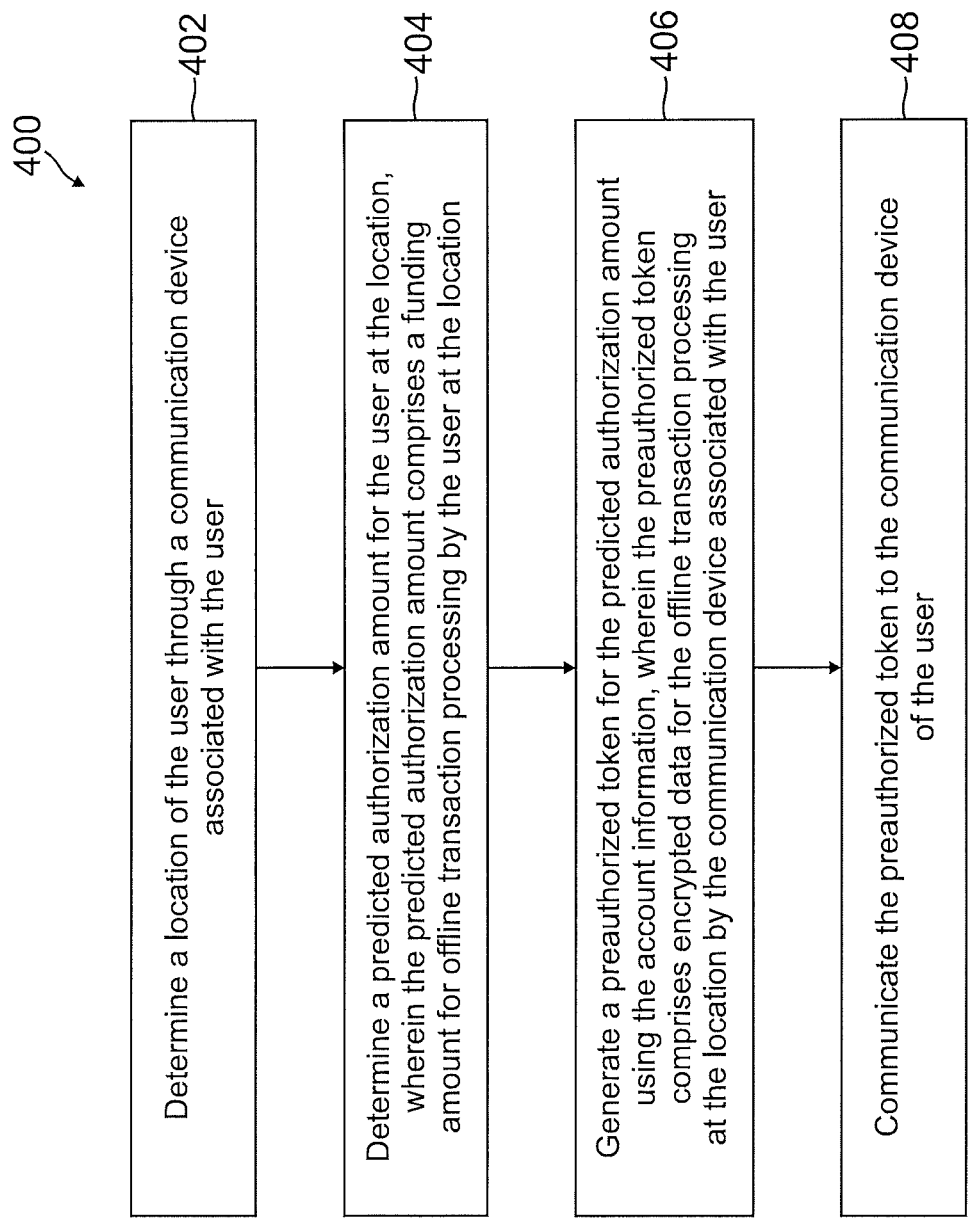
FIG. 4 is a flowchart of an exemplary process for a preloaded digital wallet token for networkless transaction processing, according to an embodiment.

FIG. 4 is a flowchart 400 of an exemplary process for risk analysis and fraud detection for electronic transaction processing flows, according to an embodiment. Note that one or more steps, processes, and methods described herein may be omitted, performed in a different sequence, or combined as desired or appropriate.

At step 402, a location of a user is determined through a communication device associated with the user. A predicted authorization amount for the user at the location is determined, at step 404, wherein the predicted authorization amount comprises a funding amount for offline transaction processing by the user at the location. The account information may comprise transaction processing limits for use of the account in the offline transaction processing by the user, wherein the predicted authorization amount is determined based on the transaction processing limits. The transaction processing limits may also comprise transaction amount limits for the offline transaction processing, funding limits for the predicted authorization amount, time limitations on use of the predicted authorization amount, and location limitations on use of the predicted authorization amount. The predicted authorization amount may also be determined based on at least one of previous transactions amounts by other users at the location, previous transactions amounts by the user at the location, sale amounts at a current time, a funding limit set by the user, funds available to the user, a merchant at the location, or a merchant type for the merchant at the location. Additionally, the predicted authorization amount may be determined based on real-time data received for transactions processed at the location.

At step 406, a preauthorized token for the predicted authorization amount is generated using account information for an account of the user, wherein the preauthorized token comprises encrypted data for the offline transaction processing at the location by the communication device associated with the user. A likelihood that the location does not provide a network connection for the communication device may be determined, wherein the preauthorized token is further generated based on the likelihood that the location does not provide a network connection. The likelihood may be determined based on at least one of past wireless network signal strengths for devices at the location, a current wireless network signal strength for at least one device at the location, past loss of network access by the devices at the location, or communication carrier coverage at the location. Additionally, in various embodiments, at least one limitation on use of the predicted authorization amount is determined, wherein the at least one limitation comprises at least one of a geographic area boundary corresponding to the location for use of the predicted authorization amount or a validity time period for valid use of the predicted authorization amount, and wherein the preauthorized token is further generated using the at least one limitation. The preauthorization token may correspond to a digital token that is valid only for limited time and/or valid only for the offline transaction processing at the location.

The preauthorized token is communicated to the communication device of the user, at step 408. In various embodiments, the account information comprises at least one funding source available in a digital wallet for use by the user during the offline transaction. Thus, the predicted authorization amount may be deducted from one or more of the at least one funding source and the predicted authorization amount for use in payment for the offline transaction processing may be held in escrow. The digital wallet may comprise information for at least one of a payment card, credit extended to the user, a bank account, or funding stored to the account. Moreover, a change in the location from the communication device may be received or determined, where a funding change in the predicted authorization amount is determined for the change in the location. Thus, the preauthorized token may be updated based on funding change for the change in the location.

In various embodiments, a mobile device system may store a preauthorized token comprising funding source data for offline transaction processing at a location for the mobile device system, wherein the funding source data is set for a predicted authorization amount for offline transaction processing by the user at the location. Thus, the mobile device system may receive a request for transaction processing for a transaction between a user associated with the mobile device system and a merchant at the location for the mobile device system, determine an absence of a network connection available for transaction processing with a service provider by the mobile device system, and communicate, to a merchant device for the merchant, the preauthorized token for the transaction processing of the transaction.

In order to interact with a merchant during offline transaction processing, the communicating the preauthorized token to the merchant device comprises encoding the preauthorized token to a barcode or a QR code and one of displaying, on an output device of the mobile device, the barcode or the QR code for scanning by the merchant device or transmitting, to the merchant device for the merchant, the preauthorized token through short range wireless communications between the mobile device system and the merchant device. Additionally, a receipt for the transaction processing of the transaction may be received, wherein the receipt comprises a payment amount processed to the merchant using the funding source data, and the preauthorized token may be updated based on the receipt, wherein the preauthorized token is valid for the predicted authorization amount less the payment amount.

In various embodiments, prior to the mobile device system detecting the absence of the network connection, the location of the mobile device system may be communicated to a service provider associated with generating the preauthorized token. Thus, the preauthorized token may be received from the service provider, wherein the service provider generates the preauthorized token based at least on the location, and the preauthorized token may be stored to the non-transitory memory for use in the offline transaction processing. Additionally, a new location of the user using the mobile device system may be detected, it may be determined that the network connection is available at the new location, and the new location may be communicated to a service provider associated with generating the preauthorized token. In response, an update to the preauthorized token may be received that comprises a new predicted authorization amount associated with the new location and the preauthorized token may be updated based on the new predicted authorization amount. The update may be based on at least one of a merchant at the new location, demographics of the new location, or past transaction processing occurring at the new location.

Figure 5:
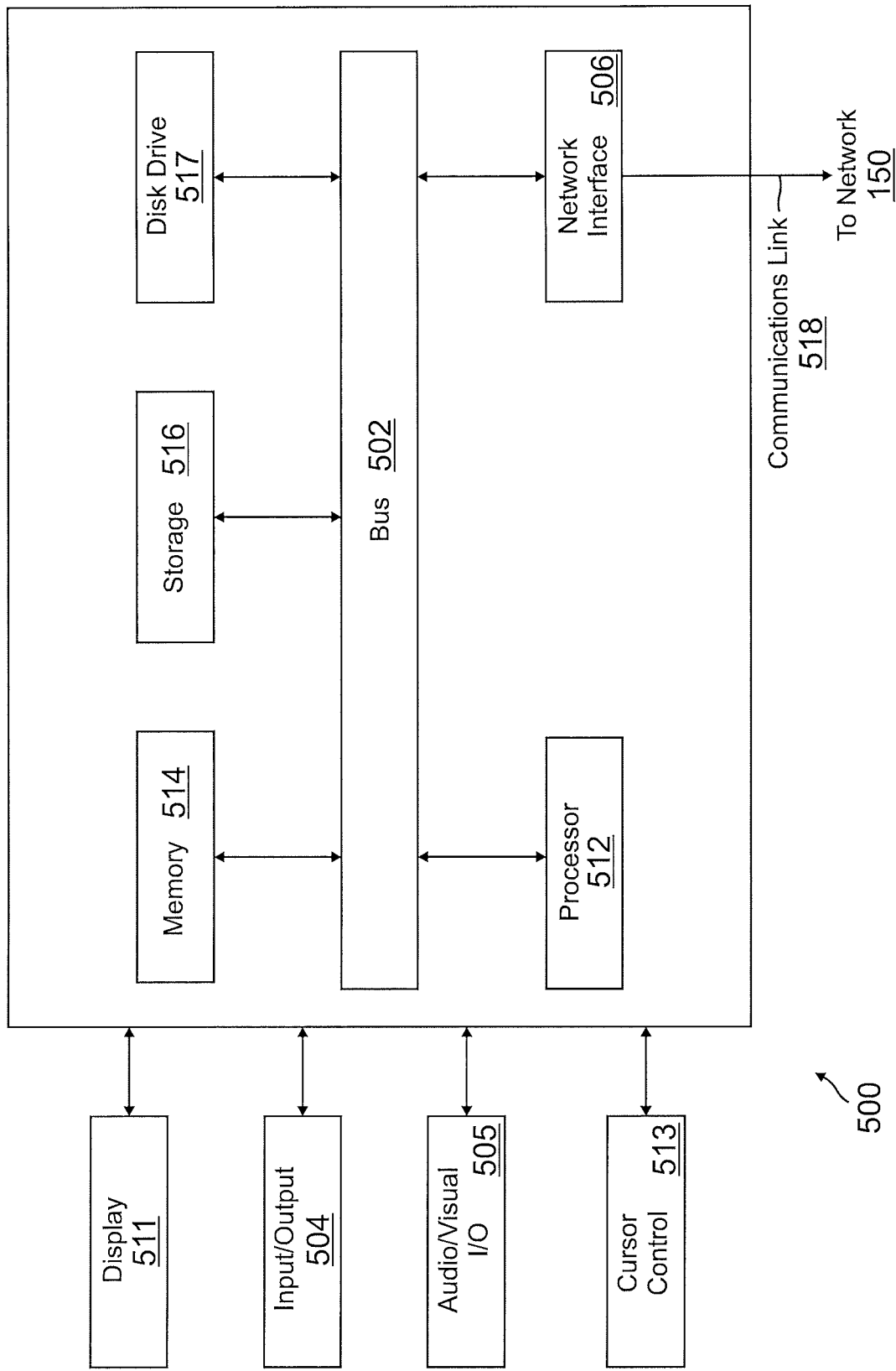
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual I/O component 505 may also be included to allow a user to use voice for inputting information by converting audio signals. Audio/visual I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
 a non-transitory memory storing account information for an account of a user; and
 one or more hardware processors configured to execute instructions to cause the system to perform operations comprising:
  determining a location of the user through a communication device associated with the user;
  monitoring a network signal strength of the communication device at the location on a cellular network;
  determining that the network signal strength is below a threshold signal strength set for a network connection with a server of the system;
  determining server status data for the server of the system;
  determining that the server status data indicates a potential downtime of the server when the communication device is at the location of the user;
  determining a sale by a merchant at the location to another user while the user is at the location, wherein the sale comprises a sale amount for an item;
  in response to determining that the network signal strength is below the threshold signal strength and the server status data indicates the potential downtime, determining a predicted purchase by the user at the location based on a search history from the communication device and the sale of the item by the merchant;
  determining a predicted authorization amount for the user at the location based on the predicted purchase and the sale of the item by the merchant, wherein the predicted authorization amount comprises a funding amount for an offline transaction processing by the user at the location for the predicted purchase;
  determining a predicted amount of time that the user may spend at the location based on one or more past visits to the location;
  generating a preauthorized token for the predicted authorization amount using the account information and the predicted amount of time, wherein the preauthorized token comprises encrypted data for the offline transaction processing at the location by the communication device associated with the user, and wherein the preauthorized token becomes invalid after the predicted amount of time; and
  communicating the preauthorized token to the communication device of the user.

2. The system of claim 1, wherein prior to the monitoring the network signal strength, the operations further comprise:
 determining a likelihood that the communication device will lose the network connection with the server of the system,
 wherein the monitoring is performed based on the likelihood.

3. The system of claim 2, wherein the likelihood is determined based on at least one of past wireless network signal strengths for devices at the location, a past loss of network access by the devices at the location, or a communication carrier coverage at the location.

4. The system of claim 1, wherein the operations further comprise:
 determining at least one limitation on a use of the predicted authorization amount, wherein the at least one limitation comprises of a geographic area boundary corresponding to the location for the use of the predicted authorization amount, and wherein the preauthorized token is further generated using the at least one limitation.

5. The system of claim 1, wherein the account information comprises a transaction processing limit for a use of the account in the offline transaction processing by the user, and wherein the predicted authorization amount is determined based on the transaction processing limit.

6. The system of claim 5, wherein the transaction processing limit comprises at least one of a transaction amount limit for the offline transaction processing, a funding limit for the predicted authorization amount, or a location limitation on the use of the predicted authorization amount.

7. The system of claim 1, wherein the account information comprises at least one funding source available in a digital wallet for a use by the user during the offline transaction processing, and wherein the operations further comprise:
 deducting the predicted authorization amount from one or more of the at least one funding source; and
 holding in escrow the predicted authorization amount for use in payment for the offline transaction processing.

8. The system of claim 7, wherein the digital wallet comprises information for at least one of a payment card, credit extended to the user, a bank account, or funding stored to the account.

9. The system of claim 1, wherein the operations further comprise:
 receiving a change in the location from the communication device;
 determining a funding change in the predicted authorization amount for the change in the location; and
 updating the preauthorized token based on the funding change for the change in the location.

10. The system of claim 1, wherein the predicted authorization amount is further determined based on at least one of a previous transaction amount by another user at the location, a previous transaction amount by the user at the location, a funding limit set by the user, funds available to the user, or a merchant type for the merchant at the location.

11. The system of claim 1, wherein the predicted authorization amount is determined based on real-time data received for transactions processed at the location.

12. A method comprising:
 determining a location of a communication device of a user;
 determining server status data for a service provider server;
 determining that the server status data indicates a potential downtime of the service provider server when the communication device is at the location that would prevent the service provider server from processing an electronic transaction with the communication device at the location over a network connection;
 determining a sale by a merchant at the location to another user while the user is at the location, wherein the sale comprises a sale amount for an item;
 determining a predicted purchase by the user at the location based on a search history of the communication device and the sale of the item by the merchant;

determining a funding amount for transaction processing based on the predicted purchase at the location and the sale of the item by the merchant;

determining a predicted amount of time that the user may spend at the location based on one or more past visits to the location;

generating, by the service provider server, a digital token for the funding amount using account information for an account of the user and the predicted amount of time, wherein the digital token comprises data for an offline transaction processing at the location by the communication device of the user, and wherein the digital token becomes invalid after the predicted amount of time; and communicating the digital token to the communication device of the user.

13. The method of claim 12, wherein the digital token is valid only for the offline transaction processing at the location.

14. The method of claim 12, further comprising:

receiving, from a merchant device, the digital token after the predicted amount of time with a transaction data for a transaction at the location;

declining to process the transaction; and invalidating the digital token.

15. A mobile device system comprising:

a non-transitory memory storing a preauthorized token comprising funding source data for an offline transaction processing by the mobile device system at a location of the mobile device system, wherein the funding source data is set by a service provider for a predicted authorization amount for the offline transaction processing by a user at the location based on a search history comprising a potential purchase by the user at the location and a sale by a merchant at the location to another user, and wherein the preauthorized token becomes invalid after a predicted amount of time that the user may spend at the location based on one or more past visits to the location; and one or more hardware processors configured to execute instructions to cause the mobile device system to perform operations comprising:

providing the search history of the mobile device system to the service provider;

receiving the preauthorized token from the service provider, wherein the preauthorized token is limited on the mobile device system based on the predicted amount of time;

receiving a request for transaction processing for a transaction between the user associated with the mobile device system and the merchant at the location for the mobile device system;

monitoring a network signal strength of the mobile device system at the location on a cellular network;

determining that the network signal strength is below a threshold signal strength set for a network connection with the service provider;

receiving server status data for the service provider;

determining that the server status data indicates a potential downtime of the service provider when the mobile device system is at the location;

communicating, to a merchant device of the merchant, the preauthorized token for the transaction processing of the transaction; and invalidating the preauthorized token after the predicted amount of time.

16. The mobile device system of claim 15, wherein the operations further comprise:

encoding the preauthorized token to a barcode or a QR code; and one of:

displaying, on an output device of the mobile device system, the barcode or the QR code for scanning by the merchant device, or:

transmitting, to the merchant device for the merchant, the preauthorized token through short range wireless communications between the mobile device system and the merchant device.

17. The mobile device system of claim 15, wherein prior to the invalidating, the operations further comprise:

receiving, from the merchant device, a receipt for the transaction processing of the transaction, wherein the receipt comprises a payment amount processed to the merchant using the funding source data; and updating the preauthorized token based on the receipt, wherein the preauthorized token is valid for the predicted authorization amount less the payment amount.

18. The mobile device system of claim 15, wherein prior to the receiving the request, the operations further comprise:

communicating the location to the service provider associated with generating the preauthorized token, wherein the preauthorized token is received in response to the providing the search history and the communicating the location.

19. The mobile device system of claim 15, wherein the operations further comprise:

detecting a new location of the user using the mobile device system;

determining that the network connection is available at the new location;

communicating the new location to the service provider associated with generating the preauthorized token;

receiving an update to the preauthorized token, wherein the update comprises a new predicted authorization amount associated with the new location; and updating the preauthorized token based on the new predicted authorization amount.

20. The mobile device system of claim 19, wherein the update is based on at least one of an additional merchant at the new location, a demographic associated with the new location, or a past transaction processing occurring at the new location.

* * * * *

UNITED STATES PATENT AND TRADEMARK OFFICE
CERTIFICATE OF CORRECTION

Page 1 of 1

PATENT NO. : 10,885,517 B2
APPLICATION NO. : 15/237545
DATED : January 5, 2021
INVENTOR(S) : Pankaj Sarin It is certified that error appears in the above-identified patent and that said Letters Patent is hereby corrected as shown below:

In the Specification

In Column 13, Line 57, change "120" to --150--

In Column 18, Line 24, change "system environment 300 showing" to --system environment showing--

In Column 18, Line 59, change "2013" to --2012--

In Column 19, Line 33, change "2013" to --2012--

In Column 19, Line 36, change "flowchart 400 of an exemplary" to --flowchart of an exemplary--

In the Claims

In Column 24, Claim 4, Line 5, changed "comprises of a geographic area" to --comprises a geographic area--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*